3,384,578
ALUMINA-BORON FIBER COMPOSITE MATERIAL
Carl D. Stuber, Columbus, Ohio, assignor to the United States of America as represented by the Secretary of the Air Force
No Drawing. Filed Nov. 25, 1966, Ser. No. 597,163
6 Claims. (Cl. 252—12)

ABSTRACT OF THE DISCLOSURE

Powdered $Al_2O_3$-B fiber mix in graphite die, compressed at 7500 p.s.i. at 3050° F. for five minutes, for friction bearings.

---

The invention described herein may be manufactured and used by or for the Government for governmental purposes without the payment to me of any royalty thereon.

This invention is a new and improved composition of matter and method of making an alumina-boron fiber composition material for use as high-temperature, high-pressure, load friction members and the like.

Bearings operating under high temperature conditions in the order of 1800 to 2500° F. have become increasingly important in recent years. Illustratively, temperatures of nearly 3000° F. may be reached by controlled surface hinged bearings for high performance aerodynamic vehicles, such as the X-20 Dyna-Soar vehicle, and an aerodynamically controlled orbital vehicles during reentry into the earth's atmosphere at superorbital speeds.

The refractory alloys of tungsten, molybdenum, etc., require coatings to protect them from oxidation. No coating is available at present which is capable of withstanding the high contact stresses experienced in bearings, as well as lubricants, that are effective at the temperatures of interest.

Investigations of bearings that are operating at 2000° F. conclude that a cermet containing alumina, chromium and tungsten, or pure alumina, excel for sliding contact bearings and that for roller contact bearings alumina and zirconia serve best. Ceramics and cermets that exhibit no plastic deformation before fracture are too brittle for bearings.

The mechanical properties that are required in high-temperature air frame bearing materials are high-load capacity which is a function of strength and hardness, low friction and low wear rate.

The problem met by the present invention is the formula of a material which has demonstrated these properties at 2000° F. (1093° C.) and very likely has the potential of demonstrating these properties over the temperature range from −100 to more than 2000° F., which corresponds to −73° C. to 1093° C.

This invention presents a bearing material comprising boron fibers and alumina bonded by heat and compression in attaining maximum performance of load capacity, low friction and low wear rate. Alumina has better mechanical strength than most ceramics. Boron fibers have a high modulus of elasticity, a very high tensile strength, and boron oxide is a high-temperature lubricant. Experimentation was accomplished on mixes of alumina in grain sizes from 15 to 100 microns with boron fibers present in from .4 to 15 weight percent. The powders and fibers were mixed under laboratory conditions and then the mix was compressed at elevated temperatures. The compressed material was then machined into bearing elements of simple geometry. The bearing elements were then subjected to both sliding contact and rolling contact tests under graduated loads at 2000° F. the 15 weight percent boron fibers may be exceeded within the scope of the present invention, where preferred.

High density alumina is preferable. Illustratively, a 99% theoretical density can be achieved by hot-pressing alumina at 3050° F. for five minutes at 7500 p.s.i. with minimum grain growth. Boron oxidizes readily at high temperatures and hence a reducing atmosphere is provided for sintering alumina-boron fiber composites. Graphite dies are used for hot-pressing alumina-boron fiber composites for minimum boron fiber oxidation.

Preferably the alumina-boron fiber composites consist of boron fibers of about one-half inch length and approximately .005 inch diameter uniformly mixed with crystalline alumina powder of from 0.7 to 1.4 micron initial particle size. The mixture is poured into a die cavity. The die comprises, within a supporting enclosure, a graphite block supporting a graphite die plug within a graphite die cored to support a graphite die punch with its lower end resting upon the alumina-boron specimen and operated from a hydraulic press. The die cavity is interposed between the static graphite die plug and the axially-driven graphite die punch. The die is heated by an induction placed around a fused silica tube within which the die is positioned. The induction coil is powdered by a 40 kilowatt frequency converter. Pressure is applied to the die by an eight-ton, four-post hydraulic press. The temperature should be held in the range 3000° F. (1649° C.) to 3070° F. (1688° C.) and the pressure at approximately 7500 p.s.i. for five to six minutes.

Due to compaction in the die, the boron fibers assumed an orientation such that nearly all the fibers were perpendicular to the direction of the applied force. In relation to an $x$, $y$ and $z$ plane coordinate system that are mutually normal to each other, and with the $z$ axis parallel to the direction of the applied force of the hot press, there is random orientation in the $x$-$y$ plane and a preferred orientation along the $x$ axis and the $y$ axis in the $x$-$z$ and $y$-$z$ planes. Final grain sizes of the alumina in the compact varied from 15 to 100 microns. The density of the end product is high but has not been actually measured.

The hot-pressed specimens are removed from the dies, cooled and machined to shape. The machining is accomplished with diamond saws, diamond grinders and diamond polishers.

In accordance with present theory, because of asperities or roughness of surfaces, the real area of contact in sliding bearings is estimated as being about one-half of one percent of the apparent areas of contact. When a hard material slides on a soft material, the harder material plows out grooves in the softer material. Where both contacting surfaces are of the same hardness, plowing can be neglected. Lubricants reduce friction by two mechanisms, by hydrodynamic lubrication or by a reduction of the shear strength of the junctions. Hydrodynamic lubrication separates two surfaces by hydrodynamic forces in a fluid film. Friction in this case is a function of the fluid viscosity, relative velocity between the two surfaces and the film thickness. Reduction of the shear strength of the junctions is accomplished by boundary lubrication where there is contact between the surfaces but a layer of lubricant prevents metal-to-metal adhesion of the asperities in the contact zone. As asperities to the contact zone under load flow plastically, lubricant is trapped therebetween and thus reduces the force required to shear the junctions. Good adhesion is a sign of a good lubricant.

X-ray diffraction analysis of the end product indicates that the boron fibers and alumina did chemically react during fabrication to form $9Al_2O_3 \cdot 2B_2O_3$, $2AlO_3 \cdot B_2O_3$ and $B_7O$. This analysis also indicates that the boron fibers did not recrystallize into tetragonal or rhombohedral boron. However electron micro-probe analysis indicates that this reaction only occurs over a very small distance (in the order of 10–25 micro-inches) at the interfaces between the alumina and boron fibers. The addition to alumina of boron fibers has a pronounced effect on the sliding coefficient of friction. This effect is believed to be at least in part due to the presence of known lubricant $B_2O_3$. Friction increased with decreases in boron fiber content of the composition. Strength of alumina increases with finer grain size. The increase of load capacity with increase in boron fibers is very evident. The rolling coefficient of friction is not affected by either microstructure or the addition of boron fibers.

It is to be understood that the composition, the process, the observations that are made herein are derived from successfully accomplished reductions to practice of the present invention and that modifications and alterations may be made therein without departing from the spirit and the scope of the present invention.

I claim:

1. A friction bearing stable in composition and conformation over a wide temperature range up to 3070° F. and under high pressures up to 7500 p.s.i. consisting of alumina grains of a size range from 15 to 100 microns and integrally bonded with boron fibers with a bond of the order of 7500 p.s.i.

2. The bearing composition of claim 1 in which the oxidized boron fibers are about one-half inch long and approximately .005 inch in diameter.

3. The composition of claim 2 in which the oxidized boron fibers constitute .4 to 15 percent by weight of the total weight prior to their having been oxidized.

4. The composition of claim 3 in which the density of the composition approaches its theoretical maximum physical density.

5. The process of making a friction bearing that is stable in composition and structure up to 3070° F. under pressures up to 7500 p.s.i. when subjected to both sliding and rolling contacts by the steps of uniformly mixing by weight a proportion of from 0.4 to 15% of boron fibers with a difference of 99.6 to 85% of powdered alumina, introducing the alumina-boron fiber mix into a die, heating the die and its contents to a temperature of about 3050° F. and compressing the heated die contents to a pressure of 7500 p.s.i., holding the hot alumina-boron fiber mix at the pressure of 7500 p.s.i. for a time on the order of five minutes, cooling the densified mix to about room temperature, and removing the densified friction bearing so made from the die.

6. The process defined by the claim 5 wherein the step of heating the die and its contents is within the range of from 3000–3070° F.

References Cited

UNITED STATES PATENTS

| | | | |
|---|---|---|---|
| 2,695,849 | 11/1954 | McMullen | 106—65 |
| 3,316,109 | 4/1967 | Rimbach | 106—65 |

DANIEL E. WYMAN, *Primary Examiner.*

I. VAUGHN, *Assistant Examiner.*